July 17, 1951  L. R. BUCKENDALE  2,560,551
BRAKE ADJUSTMENT
Filed Sept. 4, 1945  2 Sheets-Sheet 1

Inventor
Lawrence R. Buckendale,
By Strauch & Hoffman.
Attorney

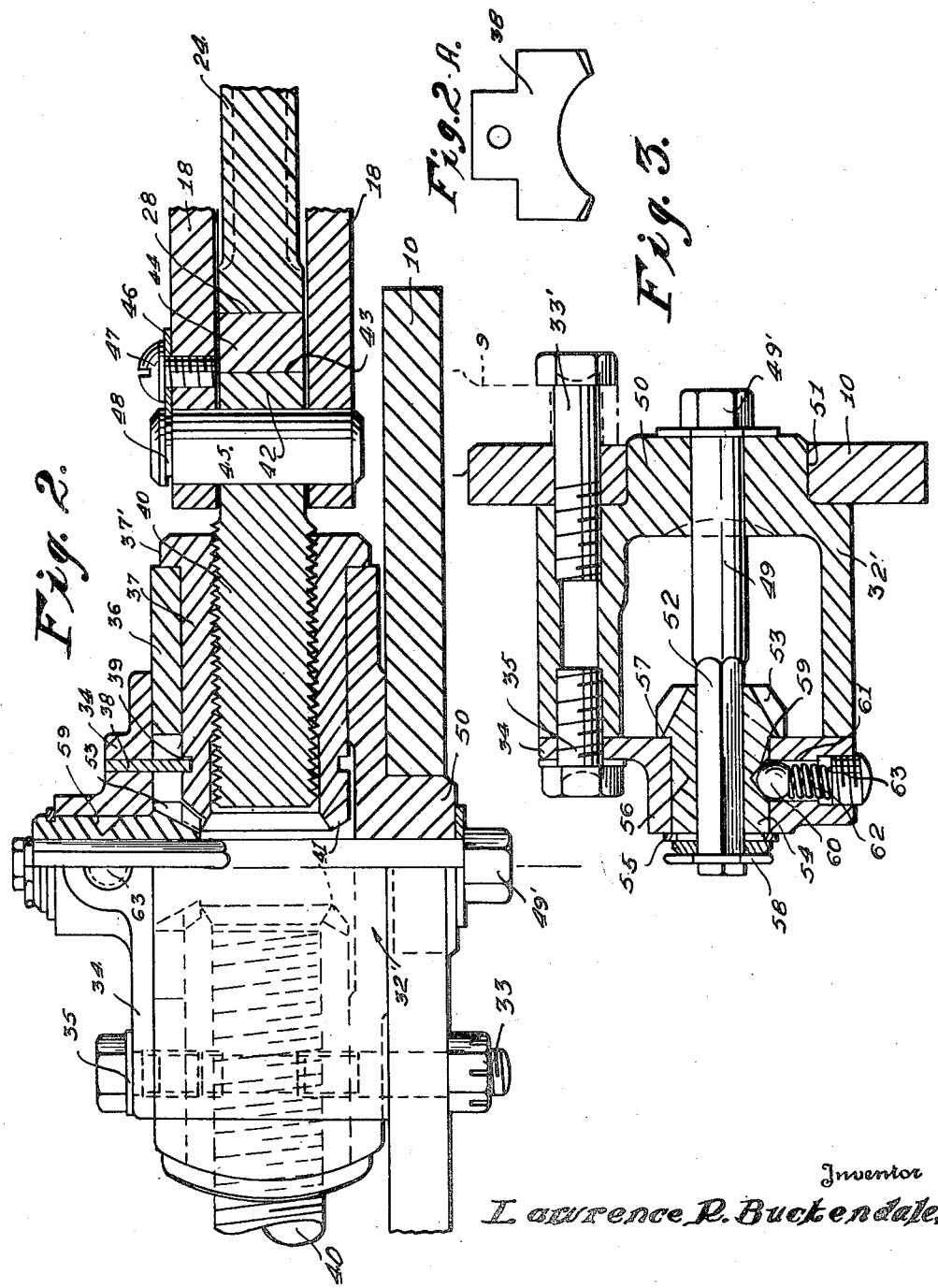

Patented July 17, 1951

2,560,551

UNITED STATES PATENT OFFICE 2,560,551

BRAKE ADJUSTMENT

Lawrence R. Buckendale, Detroit, Mich., assignor to The Timken-Detroit Axle Company, Detroit, Mich., a corporation of Ohio Application September 4, 1945, Serial No. 614,109

5 Claims. (Cl. 188—79.5)

This invention relates to brake mechanism, and more particularly to adjusting means for dual primary brakes and has for its general object and purpose to improve brake mechanism of this type disclosed in United States Letters Patent to Alden et al., Reissue No. 22,604 of February 20, 1945.

In the patented construction, pivoted brake shoe actuating levers are mounted at their opposite ends upon upper and lower pairs of individual anchor pins and the brake shoes are supported intermediate their ends for rocking and sliding movement relative to the levers, and also have sliding contact at their ends with abutment members pivotally carried by the anchor pins. The brake shoes and levers are individually adjustable relative to each other to compensate for wear by means of eccentrics formed on the lower pair of anchor pins. This mechanism has functioned with exceptional efficiency in actual service. The mounting of the brake shoes upon the actuating levers insures the transmission of braking forces of equal magnitude to the two brake shoes. However, since the brake shoes are individually adjustable by the separate spaced eccentrics, unequal adjustment of said shoes may occur so that the lining of one shoe will be urged with greater frictional pressure against the drum wall than the other, thus resulting in unequal wear of the brake linings.

It is, therefore, the major object of the present invention to provide a novel single point adjustment for such a brake assembly whereby both shoes are simultaneously and equally adjusted so that equalized lining wear will be assured under all operating conditions.

It is another object of the invention to provide novel common adjusting means for the two brake shoes which eliminates the lower anchor pins and shoe adjusting eccentrics of the prior patented construction.

A further object resides in the provision of a simply constructed novel adjusting device embodying an extensible and retractible element and a brake shoe abutment member mounted thereon for relative angular rocking movement.

An additional object of the invention is to provide a novel housing structure fixed to the brake supporting or foundation plate, and gear mechanism therein for simultaneously actuating adjusting elements operatively connected to the lower ends of respective brake shoe actuating levers.

A still further object of the invention is to provide a simple and inexpensive device for easily, quickly and accurately simultaneously adjusting the two brake shoes in definite increments so that in the normal unapplied positions of the brake shoes they will bear identically the same spaced relation to the wall of the brake drum.

With the above and other objects in view, the invention comprises the improved brake mechanism and adjusting means therefor as will be hereinafter more fully described, illustrated in the accompanying drawings and incorporated in the subjoined claims.

In the drawings, wherein I have shown one preferred practical embodiment of the present invention, and in which similar reference characters designate corresponding parts throughout the several views:

Figure 2 is an enlarged bottom plan view showing the mounting of the novel brake adjusting unit, a part thereof being shown in horizontal section substantially indicated by the line 2—2 in Figure 1;

Figure 2A is a side elevation of the sleeve retainer clip;

Figure 3 is a detail vertical sectional view of the adjustment taken substantially on the line 3—3 of Figure 1.

Figure 1:
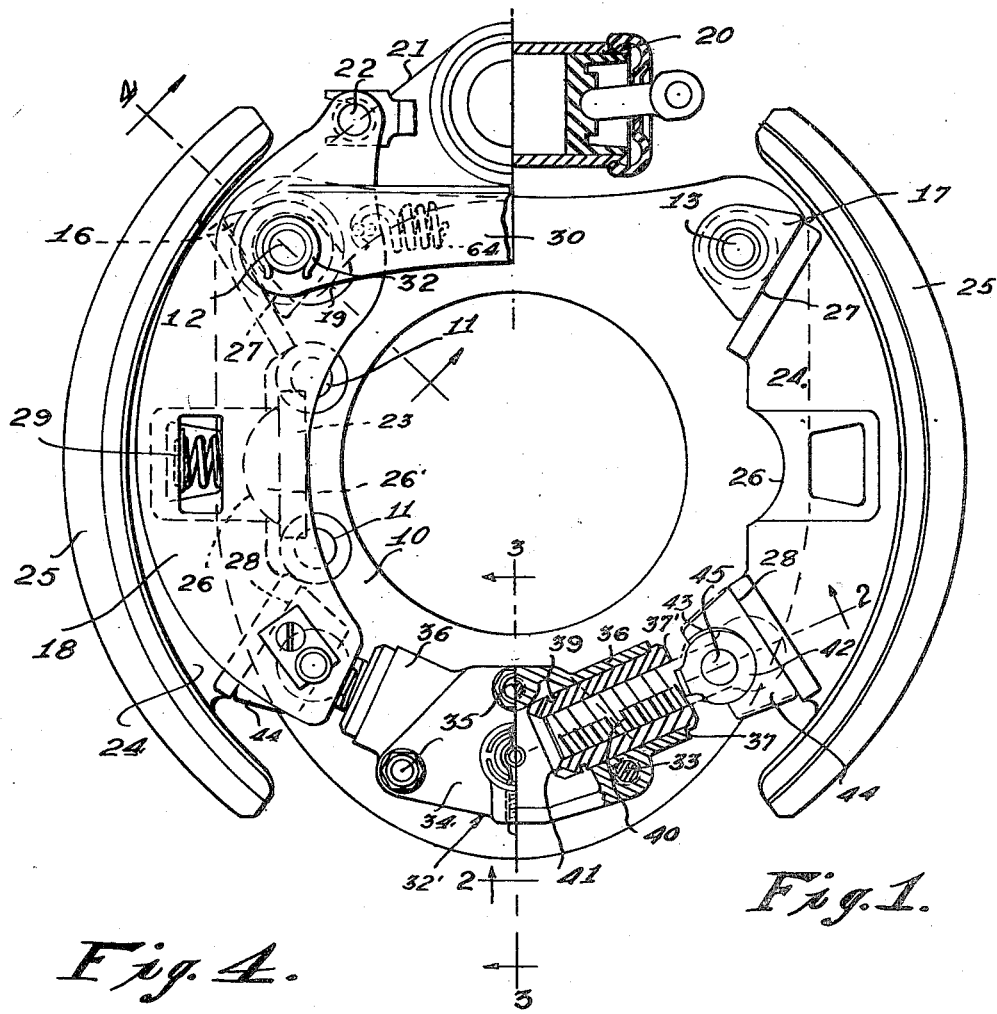
Figure 1 is an end elevation of the brake mechanism, certain parts thereof being shown in section and the brake shoe applying lever assemblies at the right omitted for clarity of illustration.
Figure 4:
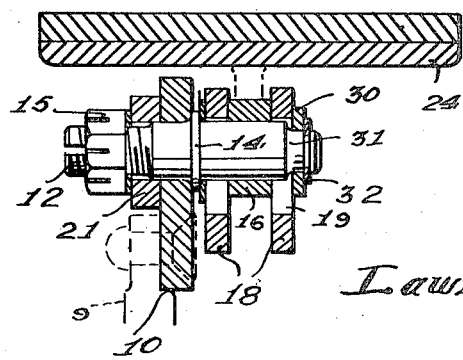
Figure 4 is a sectional view of one of the brake lever and shoe assemblies taken substantially on the line 4—4 of Figure 1.

Referring in further detail to the drawings, all of the operating parts of the brake mechanism and the adjusting means therefor are carried or supported by a suitable backing or foundation plate, shown at 10 in Figure 1, said plate adjacent to the inner edge thereof being provided with rivet or bolt receiving openings 11 whereby the plate may be rigidly secured to a suitable brake adapter flange 9 rigid with the vehicle axle. The brake shoes and levers are symmetrically arranged and supported upon the plate 10, and to the upper end of said plate a pair of spaced anchor pins 12 and 13, respectively, are rigidly secured. As shown in Figure 4, each of these anchor pins is provided intermediate of its ends with a flange 14 which is pulled into tight engagement with one side of the plate 10 by means of a nut 15 threaded on one end of said pin. Upon one end portion of each of the anchor pins the brake shoe abutment members 16 and 17, respectively, are freely pivotally supported between the upper ends of the spaced shoe actuating lever elements 18, one pair of which is shown associated with the anchor pin 12 in Figure 1 of the drawings. Lever elements 18, which are flat plates secured together in fixed parallel spaced relation for slidably embracing the brake shoe web therebetween as disclosed in said Alden et al. patent, are suitably pivoted at their lower ends and are slotted at their upper ends as at 19 for permitting angular movement of the lever assembly relative to the anchor pin.

The abutment member 16 and 17 and associated lever assemblies are retained in assembled relation on the anchor pins 12 and 13 chiefly by means of the cross or tie member 30 apertured at its ends to be pressed onto reduced end portions 31 of the anchor pins which are provided with annular grooves to receive the spring clip elements 32 holding the member 30 on the anchor pins.

Above foundation plate 10, a conventional hydraulic or pneumatic piston and cylinder actuator unit, generally indicated at 20, is supported between oppositely extending bracket arms, one of which is shown at 21, which are apertured at their ends to receive the anchor pins 12 and 13, said arms being tightly clamped against the face of the foundation plate 10 by means of nut 15. The pistons of the actuating unit 20 are pivotally connected at 22 to the upper ends of the brake lever assemblies.

The two spaced parallel lever elements 18 are rigidly connected intermediate of their ends mainly by a sturdy saddle bar 23 which is welded or otherwise secured to said lever elements.

The brake shoe 24 is provided on its outer wide flange with the usual lining 25 and the thinner web of said brake shoe slidably positioned between the lever elements 18 is formed with an inwardly facing semi-cylindrical recess 26 to rockably receive the convex surface of a force transmitting block 26' having an inner flat face in sliding contact with the adjacent flat surface of saddle bar 23 of the brake actuating lever assembly. This slidable and rockable contact between the lever assembly and brake shoe is preferably the same as disclosed in said Alden et al. patent to which reference is made for further detail. The brake shoe web is further provided at its opposite ends with equal angularly disposed abutment engaging surfaces 27 and 28, respectively. The brake shoe is yieldingly urged towards the lever assembly to maintain its seating surface 26 in rocking contact with the convex surface of the block 26' by means of the compression spring 29 reacting between the lever assembly and shoe and disposed in suitable aligned apertures in the levers and shoe as disclosed and claimed in United States Letters Patent No. 2,399,654, issued May 7, 1946.

Upon the lower end of the foundation plate 10, a common adjusting device for the two brake shoes and actuating lever assemblies is mounted. As herein shown, this device includes a suitable cup-shaped housing 32' which is rigidly fixed to the outer face of the plate 10 by means of stud and nut assemblies 33 (Figure 2), and a bolt 33' (Figure 3) which passes through both flange 9 and plate 10. A cover plate 34 closes one side of housing 32' and is secured thereto as by cap screws 35.

Housing 32' is integrally formed with oppositely extending equally upwardly inclined cylindrical bosses 36 in each of which a cylindrical sleeve 37 is rotatably supported and held against axial movement in one direction by means of a retainer clip 38 (Figure 2A) which is suitably secured to cover 34 and is arcuate at its inner end so as to fit within an annular groove 39 in the outer periphery of sleeve 37. The outer end of each sleeve 37 is provided with an annular flange 37' abutting the end of the boss 36 for preventing axial movement of the sleeve in the opposite direction. The sleeves 37 are interiorly threaded in the same direction to receive the similarly threaded adjustable pivot elements 40, and at its inner end each sleeve 37 is formed with bevel gear teeth 41.

At their outer ends, each of the adjustable pivot elements 40 is formed with an enlarged semi-circular head 42 having a convex surface for seating contact with the concave surface 43 of a rockable lower abutment member 44 with which the lower angular surface 28 of one of the brake shoe webs has sliding contact.

In head 42 of each of the adjusting elements a non-rotatable transverse pivot pin 45 is fixed, and upon the oppositely projecting cylindrical ends of this pin, the lower ends of the associated brake applying lever elements 18 are pivotally supported. Each pin 45 preferably has a pressed fit in head 42 and is locked against axial movement by means of a clip 46 secured to a lever element 18 by a screw 47 and engaged in a circumferential groove 48 provided in one end of the pin 45. Each pin 45 thus functions as a supporting pivot for the associated lever assembly, and each head 42 is a rockable support for each associated abutment member 44.

A shaft 49 is journalled in a boss 50 on the wall of housing 32' which extends in leak-proof manner through an opening 51 provided in foundation plate 10 so that head 49' of shaft 49 may be accessible for adjustment from the other side of the brake assembly. The opposite end of shaft 49 is squared, as at 52, for non-rotatable mounting thereon of a bevel gear 53 having a shank 54 rotatably mounted in a boss 56 of the housing cover plate 34. This gear 53 at opposite sides thereof is in meshing engagement with the teeth 41 on the inner ends of the sleeves 37. The shank 54 of gear 53 is provided at its outer end with a circumferential groove to receive a spring locking ring 55 which contacts the end face of the boss 56 on the cover plate 34 and cooperates with a suitable retainer assembly 58 to prevent inward axial movement of the gear element 53 relative to shaft 49. Shoulder 57 of said gear element contacts the inner face of cover plate 34 and prevents outward axial movement of the gear.

The shank 54 of gear element 53 is provided with a row of equally circumferentially spaced V-shaped notches or recesses 59 providing seats for a ball 60 mounted in a lateral bore 61 formed in boss 51 and yieldingly urged inwardly by a compression spring 62, the pressure of which may be regulated by the adjustment of a screw 63 threaded in the outer end of bore 61. This arrangement provides for sensory detection of equal adjustment increments and is a retainer for the adjusted position of shaft 49.

The brake shoe and lever assemblies are yieldingly held in a normal retracted position relative to the brake drum (not shown) by means of a retracting tension spring, partially represented at 64, and suitably connected at its opposite ends to the respective brake shoe actuating levers.

The operation of the brake mechanism of the invention is generally similar to that described in the above mentioned reissue patent and application. Thus, as seen in Figure 1, assuming that the drum is rotating in counterclockwise direction and hydraulic or pneumatic pressure is applied to the cylinder 20, the lever assembly as shown at the left will be rocked in counterclockwise direction about the axis of the lower pin 45. This action through block 26' forces the brake shoe outwardly toward the drum. Upon contact of the shoe with the inner surface of the drum wall, the shoe will rock slightly upon the lever and also be slightly displaced in a counterclockwise direction to seek full surface engagement with the drum, since block 26' has free sliding movement on the surface of saddle bar 23 and the opposite ends of the shoe are slidable upon freely rockable abutments. Since the levers are fulcrumed at the same side of the axis of rotation of the drum, the opposite lever assembly and shoe will function in exactly the same way for clockwise rotation of the drum.

Assuming that the drum is rotated in clockwise direction as seen in Figure 1 and the brake actuated as before, the drum reaction forces the brake shoe angularly in a clockwise direction so as to bring the abutment surface 27 at the upper end thereof into tight contact against the opposed surface of the abutment member 16. The brake reaction forces are thus transmitted to the anchor pin 12. The brake applying operation is otherwise the same as that above described for counterclockwise rotation of the drum.

However, it will be noted that unlike the patented construction, in the counterclockwise direction of drum rotation, the brake reaction forces are transmitted to the bodily movable or adjustable lower pins 45 instead of fixed anchor pins mounted in the foundation or supporting plate and the lower abutment members 44 are floatingly supported between the ends of adjustable elements 40 carrying the pins 45 and the contact surfaces 28 of the brake shoes 24.

To compensate for wear of the brake shoe linings and adjust the clearance relation between said linings and the wall of the brake drum, the shaft 49 and gear 53 may be manually rotated as by applying a wrench to head 49', thus simultaneously rotating both sleeves 37 about their axes and thereby simultaneously axially shifting the two adjusting elements 40 and pins 45 outwardly precisely the same distance. The lever actuating assemblies together with the brake shoes are thus also simultaneously adjusted outwardly toward the drum and, in said movement, the floating abutment members 44 may rock freely upon the ends of the adjusting elements 40 to maintain parallel full surface contact between said abutment members and the abutment surfaces 28 of the brake shoes. In the manual rotation of gear 53, the spring pressed ball 60 rides upon the peripheral surface of the shank 54 and the adjustments may thus be made in increments of definite length by observing or feeling the noise or click which results from the contact of the ball upon the walls of the depressions 59.

From the foregoing description, it will be seen that I have provided a novel brake mechanism and adjusting means therefor in which, by means of a single manually operable member, both brake shoes may be simultaneously, similarly and accurately adjusted relative to the brake drum to compensate for wear of the brake linings and insure the simultaneous braking application of the shoes to the drum wall, with substantially uniform braking pressure of the linings throughout the surface area thereof, in all adjusted positions of the brake shoes. By the elimination of the prior individually adjustable lower anchor pins, and the provision of the above described single point adjusting means, the adjusting operation may be much more easily and quickly carried out with the assurance of substantially the same clearance relation between each brake shoe lining and the brake drum, and therefor equalized lining wear. It will further be noted that the improved single point brake adjusting means is of simple, rugged and durable construction, and may be readily substituted for the adjusting means disclosed in the above referred to patented construction, without necessitating any radical changes or alterations in the brake shoe and actuating lever assemblies thereof.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake assembly, two brake levers mounted on spaced pivots at their lower ends and connected by an actuator at their upper ends, two oppositely extending members each supporting one of said pivots and each having an arcuate bearing head on one end, means mounting said members for adjustment in intersecting paths, two brake shoes in said assembly each rockably and slidably connected to one of said levers, pivoted abutments in said assembly having flat sliding engagement with the opposite ends of each of said brake shoes, the lower two of said abutments being rockably mounted on the arcuate bearing head of said pivot support members and having flat brake shoe engaging surfaces that are intersected by the paths of adjustment of the respective pivot support members, and means operatively connected to said pivot support members for simultaneously adjusting said members equally and in opposite directions for shifting said pivots to adjust said shoes relative to a brake drum.

2. In a brake assembly, a support, a pair of anchor pins rigid with said support, a pair of angularly related oppositely extending pivot members mounted on said support for movement in intersecting paths, brake shoe actuating levers each pivotally mounted at one end upon one of said members, the other ends of said levers being guided by said anchor pins, an actuator on said support interconnecting the said other ends of said levers, an arcuate bearing head on an end of each of said pivot members, abutments freely pivoted upon each of said anchor pins, abutments rockable on said bearing heads on the outer ends of each of said pivot members, brake shoes slidably and rockably connected to said levers and each having flat surfaces at opposite ends in sliding engagement with said abutments, and means for simultaneously shifting said pivot members oppositely and in respective directions intersecting to said flat abutment surfaces.

3. In a brake assembly, a pivot support member having oppositely projecting transverse pivot pins adjacent one end, an arcuate bearing head at said one end of said member adjacent the pivot axis, an abutment rockably mounted on said bearing head, a brake shoe slidably associated with said abutment, a brake actuating lever slidably and rockably connected to said shoe formed at one end to embrace said abutment and pivotally mount said lever on said pivot pins, and means for adjusting said member substantially normal to the axis of said pivot pin means.

4. In a brake assembly, a pivot member mounted for adjustment along a substantially linear path and means for effecting such adjustment, an arcuate bearing head on an end of said member, an abutment rockable on said bearing head, a brake shoe slidably engaged with said abutment, the engaged surfaces of said abutment and brake shoe being intersected by said path, and a brake actuating lever rockably and slidably engaged with said shoe having one end pivotally connected to said pivot member on an axis normal to the direction of adjustment of said pivot member.

5. In the brake assembly defined in claim 4, a support having a bore in which said pivot member is mounted for adjustment axially of said bore, and said bearing head being outside said bore.

LAWRENCE R. BUCKENDALE.

REFERENCES CITED

The following references are of record in the file of this patent:

UNITED STATES PATENTS

| Number | Name | Date |
|---|---|---|
| Re. 22,586 | Spiller et al. | Jan. 2, 1945 |
| Re. 22,604 | Alden et al. | Feb. 20, 1945 |
| 1,665,376 | Moorhouse | Apr. 10, 1928 |
| 1,782,571 | Hukill | Nov. 25, 1930 |
| 2,133,669 | Pratt et al. | Oct. 18, 1938 |
| 2,146,207 | Farkas | Feb. 7, 1939 |
| 2,152,041 | Goepfrich | Mar. 28, 1939 |
| 2,435,955 | Buckendale et al. | Feb. 17, 1948 |